CLOCK AND PROGRAM TIME COMPARING DEVICE WITH TIME DIFFERENCE INDICATION FOR SEVERAL STAGES
Filed June 16, 1960

INVENTORS
CHARLES H. WILLYARD
JOHN C. REIS
BY Mueller & Aichele
ATTYS.

3,175,187
Patented Mar. 23, 1965

3,175,187

CLOCK AND PROGRAM TIME COMPARING DEVICE WITH TIME DIFFERENCE INDICATION FOR SEVERAL STAGES

Charles H. Willyard, Wheaton, and John C. Reis, Chicago, Ill., assignors to Motorola Inc., Chicago, Ill., a corporation of Illinois Filed June 16, 1960, Ser. No. 36,504
12 Claims. (Cl. 340—146.2)

This invention pertains generally to logic circuits and in particular to a logic circuit utilized in a radio traffic control system which compares the time of a master clock with the program time as presented on coded media such as punched tape or punched cards.

In the logic circuit art and in the field of transmission of binary information, the use of simple coincidence information in various applications is well known. However, where it is necessary to control apparatus to maintain a programmed schedule according to a particular time expressed in days, hours, and minutes, for example, such simple coincidence information becomes insufficient to achieve desired results. Thus, in an automatic control device which transmits programmed control signals at a particular time, the control device, before transmitting a particular program, must ascertain whether it is behind or ahead of schedule. The control signal which is transmitted may be in any form, but it may be assumed to be in the form of radio signals.

Program information may be furnished on punched tape, cards, or any other media. The time may also be provided on the program tape or cards and compared with time on a master clock. When the master clock time is ahead of or equal to the program time for a particular program, it is desired that such program be transmitted. A device for comparing the clock and program time and which indicates a time difference throughout a plurality of stages will be called a partial subtractor and may have wide application in automatic control apparatus. Some control apparatus in use today utilize semiconductor diodes for blocking the passage of signals but devices known at the present time for comparing clock time and program time in a plurality of stages have not achieved optimum performance in a simple, inexpensive, continuous and instantaneous manner.

Thus, an object of the present invention is to provide a circuit which will compare throughout several stages the scheduled binary time on programmed media, such as tape, and binary time of a master clock.

Another object of the invention is to provide a circuit in the programmer apparatus of a radio traffic control system wherein the time difference of a particular stage and of a significant preceding stage is compared instantaneously and continually and passed to a succeeding stage for actuating related equipment in such programmer apparatus when clock time is ahead of program time or coincident thereto.

A further object of the invention is to provide a circuit utilizing semiconductor diodes whereby a logic or truth system is developed for actuating apparatus such as a programmer device.

Yet another object of the invention is to provide a partial subtractor circuit for comparing program time and clock time, such circuit being characterized by continuous and instantaneous operation.

A feature of the invention is the provision of a logic circuit for comparing clock time and program time in a programmer device, such circuit utilizing semiconductor devices which have higher reliability and accuracy than movable mechanical parts such as relays.

Another feature of the invention is the provision of a circuit having a plurality of stages wherein three input signals, one output signal, and a tone are utilized, two of the input signals being compared with each other and the third input signal being called the borrow and brought from a preceding significant stage when clock time is ahead of or coincident with program time, the output signal of the particular comparing component stage being called the borrow, if in the particular comparing stage clock time is ahead or coincident with program time.

Still another feature of the invention is the provision of a logic circuit having a plurality of stages in which each stage may utilize four semiconductor diodes each selectively biased by a voltage divider circuit having a plurality of resistances of equal value.

A further feature of the invention is the provision of a logic circuit having a plurality of semiconductor diodes biased by voltage dividers responsive to grounding through a master clock mechanism and to grounding through a coded program media such as punched cards or punched tape, the output from such logic circuit being used to actuate apparatus in a radio controlled traffic signal system to control the timing of program changes in said system.

A still further feature of the invention is the provision of a logic circuit including a plurality of stages each having a tone input signal, an input terminal connected to a prior stage, and two input terminals for applying a ground.

Yet another feature of the invention is the provision of a logic circuit having a plurality of stages wherein a tone output appears instantaneously in the most significant stage when the prior stages are in a predetermined condition thereby actuating apparatus in a radio controlled traffic signal system for controlling program changes therein.

In practicing for the invention, there is provided a programmer device of a radio controlled traffic signal system wherein a logic or partial subtractor circuit is utilized which performs a continuous and instantaneous comparison of binary representations on a coded program media such as tape and the binary representations presented by a clock. The binary input is parallel and depending on the application of the partial subtractor circuit several stages may constitute a section, and sections instead of stages may have varying significance. A borrow function is said to exist in a particular stage if the clock time is ahead of or coincident with the program time. Each stage is characterized by a plurality of semiconductor diodes biased by a plurality of voltage dividers having equal resistances. The biasing and conduction of the diodes is controlled through the voltage dividers by selective grounding from the program media and the master clock. Clock time and program time are compared throughout a plurality of stages and if the equivalent of a borrow exists in the most significant stage or section, then the programmer device is actuated by the output signal from the most significant stage or section to transmit the program scheduled for that particular time. At the completion of the program transmission, the coded tape or other coded media is moved to another frame or portion and when a borrow again exists in the most significant stage or section, the next program is transmitted. This is repeated until a borrow does not exist in the most significant stage and the programmer must wait until clock time equals or exceeds program time. In other words, when a borrow does not exist it is represented by program time being ahead of the clock time and the programmer will then wait until the program time equals or exceeds the master clock time before stepping or moving the tape. A decision is made in each stage of the circuit when the binary program input and clock time input are not equal. If clock time is ahead of or coincident with the program time, a borrow is said to exist in that particular stage and the next more significant stage makes a decision regarding program time and clock time. The partial subtractor circuit therefore compares clock time and program time and if the clock time is equal to or ahead of the program time the programmer apparatus initiates transmission of a particular program.

In describing the operation of the circuit the word "comparing" is used but such word should be understood to include the complete function of the circuit wherein an indication or determination of clock time and program time is accomplished.

Figures 1, 2, 3:
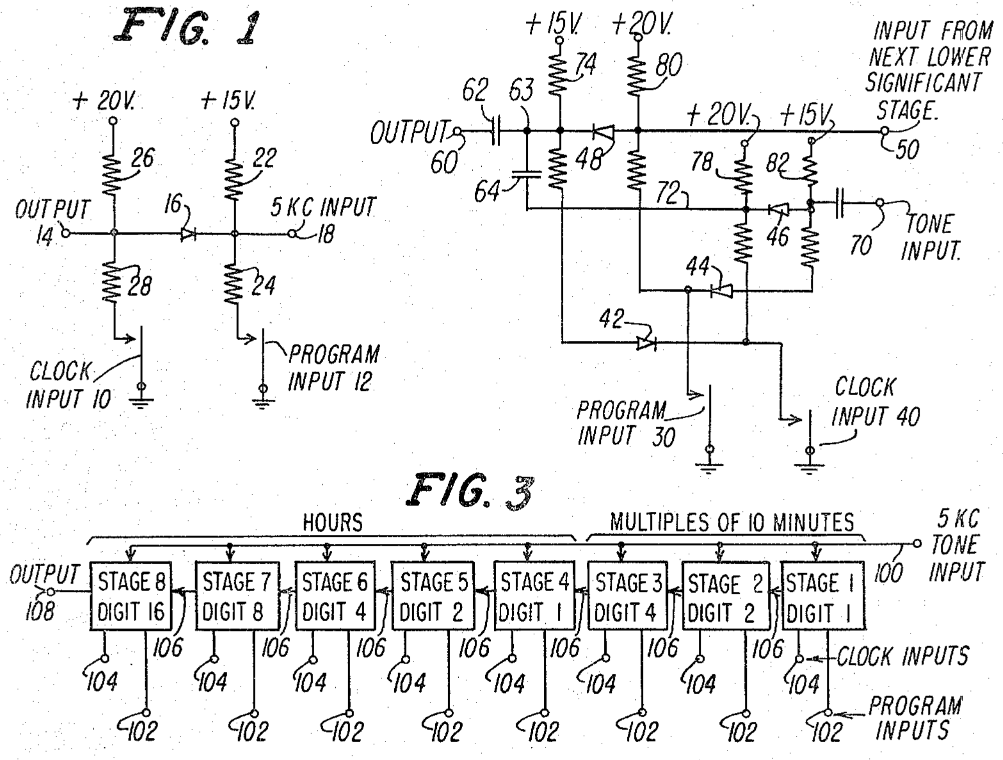
FIG. 1 is a circuit schematic showing a component of one stage of a partial subtractor circuit utilized in the invention.
FIG. 2 is a schematic diagram of a typical stage of a partial subtractor circuit.
FIG. 3 is a block diagram of several stages similar to the stage illustrated in FIG. 2 connected in cascade to form two time unit sections representing hours and multiples of ten minutes.

Referring now to the drawings, in FIG. 1 there is shown a typical segment of a stage illustrating the operating principle employed in the invention. The system operates from binary information each bit of which will be described as a "one" or a "'zero." A "one" indicates closure to ground on the clock input 10 or program input 12. On output 14 a "one" indicates diode 16 is conducting and passing to output 14 the 5 kilocycle input signal being applied at input 18. When the clock and program inputs 10 and 12 are not grounded, diode 16 will conduct because the anode potential is 20 volts and the cathode potential is 15 volts. The voltage divider circuits consisting of resistors 22 and 24 and resistors 26 and 28, all of such resistors having equal resistance, do not lower the 15 volt and 20 volt potential when neither program input 12 nor clock input 10 is grounded.

When clock input 10 is not grounded and program input 12 is grounded, the diode 16 will again be in a condition for conduction because the potential of 20 volts at the anode is higher than the cathode potential of 7½ volts. The cathode potential is 7½ volts because of the voltage drop of 7½ volts across resistor 22. If the clock input 10 is grounded and the program input 12 is not grounded, the potential on the anode of diode 16 drops to about 10 volts because of the voltage drop of 10 volts across resistor 26 and consequently, because the anode voltage is lower than the cathode voltage, diode 16 will not conduct.

When both clock input 10 and program input 12 are grounded, the potential on the anode and cathode of diode 16 drops to about 10 volts and 7½ volts respectively, and the diode will conduct since the anode is more positive than the cathode.

FIG. 2 is a schematic diagram of one stage of the partial subtractor circuit of the invention wherein four diodes 42, 44, 46 and 48 are used. A plurality of resistors having equal values form voltage dividers to provide desired voltages to the diodes. In FIG. 2 when neither program input 30 nor clock input 40 is grounded, diode 48 is in a state of conduction since the anode voltage of 20 volts exceeds the cathode voltage of 15 volts. Diode 46 is blocked under these conditions since the cathode potential of 20 volts exceeds the anode potential of 15 volts. Therefore, the stage does not make a decision to conduct or not to conduct the tone from tone input 70 through lead 72 to the stage output 60. If a tone output from the next lower significant stage appears at input 50, the tone from input 50 will be passed through diode 48 and coupling capacitor 62 to the output 60.

When clock input 40 is grounded and program input 30 is not grounded, in other words when clock time is ahead of program time, diode 48 will again be in a state of conduction since the anode potential is 20 volts and the cathode potential is 7½ volts due to the voltage drop across resistor 74. Diode 46 will be in a state of conduction since the anode potential is 15 volts and the cathode potential is 10 volts due to the voltage drop across resistor 78. Diode 42 is in a state of conduction since the anode is at 7½ volts potential and the cathode is at ground or zero potential. Thus, the stage must make a decision and the decision is to pass the tone from input 70 through lead 72 and capacitor 64 to output terminal 60. If an input from the next lower significant stage is being applied at input 50, diode 48 will pass this signal and it will join the signal from input 70 at 63. The signals from inputs 50 and 70 are in phase with each other and are pasesd to output 60. Under these conditions a borrow is said to exist in this particular stage.

If program input 30 is grounded and clock input 40 not grounded, in other words, when the clock time is behind the program time, diode 48 is blocked because the potential at its anode is 10 volts due to the voltage drop across resistor 80 and the cathode potential is 15 volts. Diode 46 is also blocked since its anode potential is 15 volts and the cathode potential is 20 volts. Diode 44 is in a state of conduction since its anode voltage is 7½ volts and the cathode voltage is at ground or zero potential. Thus, the stage again must make a decision but the decision is to block the tone applied at input 70 thereby preventing tone passage to output 60 and to the next more significant stage. If an input signal is being applied at 50 from a next lower significant stage, diode 48 blocks the passage of the signal and there is no signal applied to output 60. This is proper because clock time is behind the program time and related apparatus should not be actuated until the clock "catches up" with the program time.

When clock input 40 and program input 30 are both grounded, diode 48 is in a state of conduction and diode 46 is blocked. Diode 48 conducts because the potential on its anode is 10 volts due to the voltage drop across resistor 80 compared with 7½ volts on the cathode due to the voltage drop across resistor 74. Diode 46 is blocked because the anode potential is 7½ volts due to the voltage drop across resistor 82 and the cathode potential is 10 volts due to the voltage drop across resistor 78. Thus, the stage in this instance is not required to render a decision on whether or not to pass the tone signal applied at input 70. If a tone input from the next lower significant stage appears at input 50 however, the tone is passed from the next lower stage through diode 48 and capacitor 62 to the output 60 and on to the next more significant stage.

Summarizing, when both the clock and the program inputs are not grounded, or both inputs are grounded, the stage does not have to make a decision and if there is a tone from input 50 from the next lower significant stage it is passed through diode 48 and capacitor 62 to the output 60 and on to the input of the next more significant stage. The tone signal applied at 70 is blocked by diode 46. If there is no next lower significant stage a tone signal will be applied to input 50 of the stage. When the clock input is grounded and the program input is not grounded or the program input is grounded and the clock input is not grounded, the stage must make a decision and the conducting state of the diodes determined by the potential on the anode and cathode of each diode determines whether or not the tone signal applied from inputs 50 and 70 passes to output 60 and to the next more significant stage.

In FIG. 3 there is shown in block diagram form, eight stages which are each similar to the stage shown in FIG. 2. Stages 4 through 8 represent hours and stages 1 through 3 represent multiples of ten minutes. A tone signal is applied through lead 100 to each of the stages. The tone signal input may have a frequency of 5 kc. The input to each stage from lead 100 corresponds to input 70 in FIG. 2. Also a program input is applied at terminal 102 of each stage corresponding to program input 30 in FIG. 2, and a clock input corresponding to clock input 40 in FIG. 2 is applied at terminal 104 of each stage. All of the stages, except stage 1, have an input 106 corresponding to input 50 shown in FIG. 2. Input 106 to a particular stage is the output from the adjacent stage until, at output 108, the tone signal may be amplified by other apparatus and used to actuate other control equipment. Thus, although there may not be a tone input 106 from an adjacent stage, the 5 kc. tone signal is still applied to each stage by tone signal lead 100. The tone frequency is not critical and although a 5 kc. signal has been described, the frequency may vary by several thousand cycles per second without impairing operation of the circuit.

The number of stages used for a particular application may depend on the units of time which are recorded on the program media and the type of clock used. The number of stages must correspond to the number of bits in the binary representations of time. In the explanation of FIG. 3 one may assume that a 24 hour clock is used.

As previously stated, stages 8 through 4 may represent hours of which there are 24 in a day and 24 on the 24 hour clock. Stage 8 may represent digit 16, stage 7 digit 8, stage 6 digit 4, stage 5 digit 2, and stage 4 digit 1. Various combinations of stages thereby give an arithmetic total of from 1 to 24 thereby constituting the hour section.

Stages 3 through 1 may represent multiples of ten minutes not to exceed five since six ten minute multiples equal one hour. Stage 3 may represent digit 4, stage 2 digit 2, and stage 1 digit 1. Thus, various combinations of these stages may give an arithmetic total of from 1 to 6. Stages 3 through 1 constitute the ten minute multiples section.

Assume that clock time is 15:50 and that program time is 15:40. In binary representation where "one" indicates an input ground, clock time would be 01111101 indicating that a clock input ground is being applied to stages 7, 6, 5 and 4 in the hour section to give an arithmetic total of 15 hours. In the ten minute section stages 3 and 1 would have clock input grounds thereby giving an arithmetic total of 5 to represent 50 minutes. Program time would be represented in binary form as 01111100 thereby applying a program input ground to the same stages as the clock input ground except that a program ground would not be applied to stage 1 and stage 1 would then have a clock input ground but no program input ground and a decision would be made in this stage to pass the tone signal input applied from lead 100 in accordance with the explanation given in describing FIG. 2. The tone signal would appear at output 108 to indicate that program time is behind clock time and the program would be transmitted.

If clock time happens to be 15:50 and program time is 16:00, the binary representation for clock time would be the same as before, 01111101. Program time in binary representation would be 10000000 thereby indicating that a program input ground is being applied in the hour section to stage 8 which represents digit 16. As explained in the description of operation for FIG. 2, no tone output would appear at output 108 although the tone signal would have been passed through stages 1 through 7 and stage 8 would be the most significant stage in this instance.

Although an example has been given using only hours and ten minutes as time units, any practical time units including seconds may be used since the partial subtractor circuit operation is instantaneous and continuous.

Figure 4:
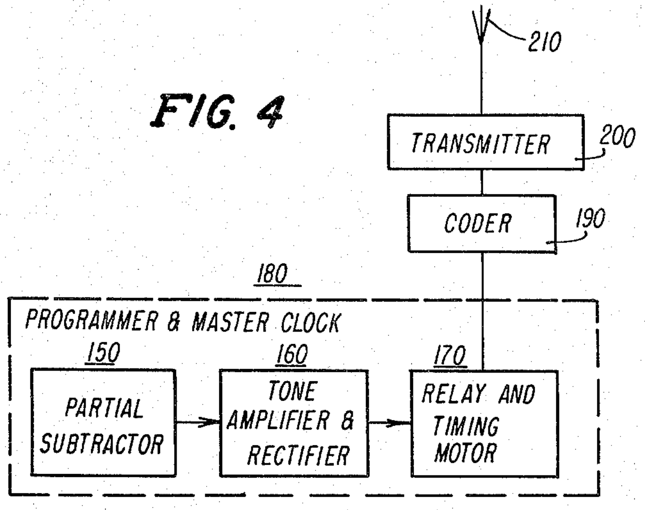
FIG. 4 is a block diagram of a portion of a radio controlled traffic signal system wherein the invention is part of the programmer device.

An example of the use of the output from a partial subtractor circuit is shown in block diagram form in FIG. 4 which represents part of a traffic signal control system wherein the invention has been successfully incorporated. The output tone signal from partial subtractor 150 is fed to tone amplifier and rectifier 160. The direct current potential is then used to energize a relay which energizes a timing motor. The relay and timing motor are represented in block 170. As indicated in FIG. 4, the partial subtractor 150, tone amplifier and rectifier 160 and relay and timing motor 170 together form a programmer and master clock unit 180. The timer motor is used to apply selected tone frequencies through tone gates in coder 190 to transmitter 200 and antenna 210. The transmitter is centrally located and is used to control traffic signal lights in accordance with the overall plan of traffic control. If the tone circuit becomes inoperative for some reason the programmer will not initiate program changes. This feature is an improvement over circuits wherein a tone signal is used for disabling purposes. In such circuits if the tone signal is not present the equipment might "run-away."

Thus, the invention provides a highly reliable logic circuit in the form of a partial subtractor whereby clock time is compared with program time through a continuous parallel binary input to a plurality of stages. The invention has been used successfully in a traffic signal system controlled by radio but it may be applied whenever continuous parallel binary representations are used.

We claim:

1. A circuit for comparing parallel information from two sources to control the application of an alternating current signal from an input terminal to an output terminal including in combination, a diode connected between said input terminal and said output terminal, a first voltage divider having first and second end terminals and an intermediate point connected to said input terminal, a second voltage divider having first and second end terminals and an intermediate point connected to said output terminal, means applying different direct current potentials to said first end terminals of said first and second voltage dividers, first and second switches controlled by the sources and respectively connected to said second end terminals of said first and second voltage dividers for selectively connecting the same to a reference potential to cause current flow through said voltage dividers, with said first and second switches controlling the potential across said diode to thereby control the conductivity thereof to pass said signal from said input terminal to said output terminal.

2. A circuit for comparing a clock time signal and a program time signal each in the form of a binary representation having a plurality of bits which are applied to the circuit in parallel, said circuit including a plurality of stages corresponding to the number of bits, said stages being coupled to each other with said stages ranging from a most significant stage to a least significant stage, each of said stages having first and second tone signal inputs, a clock time input, a program time input, an output, and first and second rectifier devices coupled respectively from said first and second tone signal inputs to said output, means continuously applying tone signals to said first tone signal inputs of all said stages and to said second tone signal input of said least significant stage, means applying said bits of said binary representations of clock time and program time to said clock time inputs and said program time inputs respectively of said stages, biasing means for controlling conduction of said first rectifier device of each stage to apply signals from said first tone signal input to said output of a stage when the signal applied to said clock time input thereof represents a time ahead of the signal applied to said program time input thereof, said second tone signal input of each of said stages except said least significant stage being coupled to the output of the adjacent less significant stage, and biasing means for controlling conduction of said second rectifier device of each stage to apply signals from said second tone signal input to said output when the signal applied to said clock input thereof represents a time equal to or ahead of the signal applied to said program time input, said stages operating simultaneously whereby said most significant stage produces an output when the clock time signal equals or exceeds the program time signal.

3. A circuit for comparing a clock time signal and a program time signal each in the form of a binary representation having a plurality of bits which are applied to the circuit in parallel, said circuit including a plurality of stages, corresponding to the number of bits, coupled to each other with said stages ranging from a most significant stage to a least significant stage, at least one of said stages having first and second tone signal inputs, a clock time input, a program time input, an output, and first and second rectifier devices coupled respectively from said first and second tone signal inputs to said output, means continuously applying tone signals to said first tone signal input, means applying one of said bits of said binary representation of clock time to said clock time input and one of said bits of said binary representation of program time to said program time input, biasing means for controlling conduction of said first rectifier device to apply signals from said first tone signal input to said output when the signal applied to said clock time input represents a time ahead of the signal applied to said program time input, said second tone signal input being coupled to the output of the adjacent less significant stage, and biasing means for controlling conduction of said second rectifier devices to apply signals from said second tone signal input to said output of a stage when the signal applied to said clock input thereof represents a time equal to or ahead of the signal applied to said program time input.

4. A circuit for comparing a clock time signal and a program time signal each in the form of a binary representation having a plurality of bits which are applied to the circuit in parallel, said circuit including a plurality of sections coupled to each other which represent different units of time with said sections ranging from a most significant section to a least significant section, each of said sections having a plurality of stages coupled to each other which represent different time intervals with said stages ranging from a most significant stage to a least significant stage, said stages corresponding in number to the bits of each binary signal, each of said stages having a first tone signal input, a clock time input for receiving one bit of the binary clock time signal, a program time input for receiving one bit of the binary program time signal, an output, and a first rectifier device coupled from said first tone signal input to said output and biased for selective conduction of signals in accordance with signals applied to said clock time input and said program time input, all of said stages except said least significant stage of said least significant section having a second tone signal input coupled to the output of the adjacent less significant stage and a second rectifier device coupled from said second tone input to said output and biased for selective conduction of signals in accordance with signals applied to said clock time input and said program time input, said stages operating simultaneously whereby said most significant stage of said most significant section produces an output when said clock time equals or exceeds said program time.

5. A circuit for comparing a clock time signal and a program time signal each in the form of a binary representation having a plurality of bits which are applied to the circuit in parallel, said circuit including a plurality of stages corresponding to the number of bits, said stages being coupled to each other with said stages ranging from a most significant stage to a least significant stage, each of said stages having first and second tone signal inputs, a clock time input, a program time input, an output, and first and second rectifier circuits coupled respectively from said first and second tone signal inputs to said output, means continuously applying tone signals to said first tone signal inputs of all said stages and to said second tone signal input of said least significant stage, means applying said bits of said binary representations of clock time and program time to said clock time inputs and said program time inputs respectively of said stages, said second tone signal input of all of said stages except said least significant stage being coupled to the output of the adjacent less significant stage, and biasing means for controlling conduction of said first and second rectifier circuits of each stage to apply signals from said first tone signal input to said output of a stage when the signal applied to said clock time input thereof represents a time ahead of the signal applied to said program time input thereof, and to apply signals from said second tone signal input to said output of a stage when the signal applied to said clock input thereof represents a time equal to or ahead of the signal applied to said program time input, said biasing means including means for isolating said first and second rectifier circuits, said stages operating simultaneously whereby said most significant stage produces an output when the clock time signal equals or exceeds the program time signal.

6. A circuit for comparing a clock time signal and a program time signal each in the form of a binary representation having a plurality of bits which are applied to the circuit in parallel, said circuit including a plurality of stages corresponding to the number of bits, said stages being coupled to each other with said stages ranging from a most signficant stage to a least significant stage, each of said stages having a first tone signal input, a clock time input, a program time input, an output, and a first circuit including a first rectifier device coupled from said first tone signal input to said output, means continuously applying tone signals to said first tone signal inputs of all said stages, means applying said bits of said binary representations of clock time and program time to said clock time inputs and said program time inputs respectively of said stages, and biasing means for each stage coupled to said first rectifier device thereof for controlling conduction thereof to apply signals from said first tone signal input to said output of a stage when the signal applied to said clock time input thereof represents a time ahead of the signal applied to said program time input thereof, each of said stages except said least significant stage having a second tone signal input coupled to the output of the adjacent less significant stage and a second circuit including a second rectifier device coupled from said second tone signal input to said output, said biasing means being coupled to said second rectifier device for controlling conduction thereof to apply signals from said second tone signal input to said output when the signal applied to said clock input thereof represents a time equal to or ahead of the signal applied to said program time input, said biasing means including a diode coupling said program time input to said first rectifier device and another diode coupling said clock time input to said second rectifier device for isolating said first and second circuits.

7. A circuit for comparing a clock time signal and a program time signal each in the form of a binary representation having a plurality of bits which are applied to the circuit in parallel, said circuit including a plurality of stages corresponding to the number of bits, said stages being coupled to each other with said stages ranging from a most significant stage to a least significant stage, each of said stages having first and second tone signal inputs, a clock time input, a program time input, an output, and a first semiconductor diode coupled from said first tone signal input to said output, means continuously applying tone signals to said first tone signal inputs of all said stages and to said second tone signal input of said least significant stage, means applying said bits of said binary representations of clock time and program time to said clock time inputs and said program time inputs respectively of said stages, biasing means for controlling conduction of said first diode of each stage to apply signals from said first tone signal input to said output of a stage when the signal applied to said clock time input thereof represents a time ahead of the signal applied to said program time input thereof, said second tone signal input of each of said stages except said least significant stage being coupled to the output of the adjacent less significant stage to receive borrow signals therefrom when the clock time inputs to the less significant stages represent times equal to or ahead of the program time inputs, each of said stages having a second semiconductor diode coupled from said second tone signal input to said output, and biasing means for controlling conduction of said second diode of each stage to apply signals from said second tone signal input to said output when the signal applied to said clock input thereof represents a time equal to or ahead of the signal applied to said program time input, said stages operating simultaneously whereby said most significant stage produces an output when the clock time signal equals or exceeds the program time signal.

8. A partial subtractor circuit for use in a system for controlling traffic light devices through radio signals, and which system includes a master clock, a programmer device including coded program media, means for generating a tone signal, rectifier means, and relay means coupled to said rectifier means and to said programmer device for controlling the transmission of programs by the programmer device; said partial subtractor circuit including in combination, a plurality of stages coupled together ranging from a most significant stage to a least significant stage, each of said stages having a first tone signal input, a clock time input, a program time input, an output, and a first rectifier device coupled from said tone signal input to said output, means for applying signals from the tone signal generating means to said first tone signal inputs of all said stages, means coupled to the master clock for applying binary time signals to said clock time input, means coupled to the programmer device for applying binary time signals to said program time input, all of said stages except said least significant stage having a second tone signal input coupled to the output of the adjacent less significant stage and a second rectifier device coupled from said second tone signal input to said output, and biasing means coupled to said first and second rectifier devices and responsive to signals applied to said clock time input and said program time input for controlling conduction of signals from said first and second tone inputs to said output, said stages operating simultaneously whereby said most significant stage produces an output when said clock time equals or exceeds said program time, and means for applying said output from said most significant stage to the rectifier means and thence to the relay means for actuating the programmer device.

9. A partial subtractor circuit for use in a system for controlling traffic light devices through radio signals, and which system includes a master clock for providing binary clock time signals having a predetermined number of bits, a programmer device including coded program media and providing a program time signal having said predetermined number of bits, means for generating a tone signal, rectifier means, and relay means coupled to said rectifier means and to said programmer device for controlling the transmission of selected programs by the programmer device; said partial subtractor circuit including in combination, a predetermined number of stages coupled together ranging from a most significant stage to a least significant stage, each of said stages having first and second tone signal inputs, a clock time input, a program time input, an output, and first and second semiconductor diodes coupled respectively from said first and second tone signal inputs to said output, means for applying signals from the tone signal generating means to said first tone signal inputs of all said stages and to said second tone signal input of said least significant stage, means coupled to the master clock for applying binary time signals to said clock time inputs, means coupled to the programmer device for applying binary time signals to said program time inputs, said second tone signal input of all of said stages except said least significant stage being coupled to the output of the adjacent less significant stage, and biasing means coupled to said first and second diodes and responsive to signals applied to said clock time input and said program time input, said biasing means controlling conduction of said first semiconductor diode for applying signals from said first tone input to said output of a stage when the signal applied to said clock time input thereof represents a time ahead of the signal applied to said program time input thereof, said biasing means controlling conduction of said second semiconductor diode for applying signals from said second tone input to said output of a stage when the signal applied to said clock time input thereof represents a time equal to or ahead of the signal applied to said program time input thereof, said stages operating simultaneously whereby said most significant stage produces an output when said clock time equals or exceeds said program time, and means for applying said output from said most significant stage to the rectifier means and thence to the relay means for actuating the programmer device.

10. A circuit for comparing first and second control signals, each of which is in the form of a binary representation having a plurality of bits which are present simultaneously, said circuit including a plurality of stages corresponding to the number of bits, said stages being coupled to each other with said stages ranging from a most significant stage to a least significant stage, each of said stages having first and second tone signal inputs, first and second control signal inputs, an output, and first and second gate devices coupled respectively from said first and second tone signal inputs to said output, means continuously applying tone signals to said first tone signal inputs of all said stages and to said second tone signal input of said least significant stage, means for simultaneously applying said bits of said binary representations of said first and second control signals to said first and second control signal inputs respectively of said stages, biasing means for controlling conduction of said first gate device of each stage to apply signals from said first tone signal input to said output of such stage when the binary signal applied to said first control signal thereof represents a number greater than the binary signal applied to said second control signal input thereof, said second tone signal input of each of said stages except said least significant stage being coupled to the output of the adjacent less significant stage, and biasing means for controlling conduction of said second gate device of each stage to apply signals from said second tone signal input to said output when the binary signal applied to said first control signal input thereof represents a number equal to or greater than the binary signal applied to said second control signal input, said stages operating simultaneously whereby said most significant stage produces an output when the first control signal represents a number which equals or exceeds the number represented by the second control signal.

11. A circuit for comparing first and second control signals, each of which is in the form of a binary representation having a plurality of bits which are present simultaneously, said circuit including a plurality of stages equal in number to the number of bits, said stages being coupled to each other with said stages ranging from a most significant stage to a least significant stage, at least one of said stages having first and second tone signal inputs, first and second control signal inputs, an output, said first and second gate devices coupled respectively from said first and second tone signal inputs to said output, means continuously applying tone signals to said first tone signal input, means applying one of said bits of said binary representation of the first control signal to said first control signal input and one of said bits of said binary representation of the second control signal to said second control signal input, biasing means for controlling conduction of said first gate device to apply signals from said first tone signal input to said output when the signal applied to said first control signal input represents a number greater than the number represented by the signal applied to said second control signal input, said second tone signal input being coupled to the output of the adjacent less significant stage, and biasing means for controlling conduction of said second gate device to apply signals from said second tone signal input to said output of a stage when the signal applied to said first control signal input thereof represents a number equal to or greater than the number represented by the signal applied to said second control signal input.

12. A logic circuit having an output terminal and first and second input terminals, first and second comparing circuits respectively connecting said first and second input terminals to said output terminal, said first and second comparing circuits each acting to provide a conductive path from the associated input terminal to said output terminal in respect to first and second control signals having a predetermined relation, and switch means including first and second portions separate from said input terminals and responsive respectively to first and second control signals to be compared, said switch means including first circuit means connecting said first and second portions of said switch means to said first comparing circuit for applying said first and second control signals thereto and second circuit means connecting said first and second portions of said switch means to said second comparing circuit for applying said first and second control signals thereto, said first and second circuit means including diode means for isolating said first and second comparing circuits from each other.

References Cited by the Examiner

UNITED STATES PATENTS

| | | | |
|---|---|---|---|
| 2,082,550 | 6/37 | Powell | 340—345 |
| 2,600,268 | 6/52 | Sagalyn | 340—345 |
| 2,641,696 | 6/53 | Woolard | 340—146.2 X |
| 2,910,667 | 10/59 | Lubkin | 340—149 |
| 2,923,475 | 2/60 | Ketchledge | 340—146.2 |
| 2,931,919 | 4/60 | Sacks | 307—88.5 |
| 2,959,768 | 11/60 | White et al. | 340—149 |
| 3,090,032 | 5/63 | Shand et al. | 340—41 |

MALCOLM A. MORRISON, *Primary Examiner.*

IRVING L. SRAGOW, *Examiner.*